United States Patent [19]

Caimi et al.

[11] Patent Number: 4,777,501

[45] Date of Patent: Oct. 11, 1988

[54] UNDERWATER OPTICAL METHODS AND APPARATUS

[75] Inventors: Frank M. Caimi, Vero Beach; Robert F. Tusting, Ft. Pierce, both of Fla.

[73] Assignee: Harbor Branch Oceanographic Institution, Inc., Ft. Pierce, Fla.

[21] Appl. No.: 40,991

[22] Filed: Apr. 20, 1987

[51] Int. Cl.$^4$ .................. G03B 13/18; G03B 17/08
[52] U.S. Cl. .................................... 354/64; 354/162
[58] Field of Search ........................ 354/64, 162, 163

[56] References Cited

U.S. PATENT DOCUMENTS 3,836,919  9/1974  Matsumoto et al. ............. 354/163 X

FOREIGN PATENT DOCUMENTS 2208066  8/1973  Fed. Rep. of Germany ........ 354/64

*Primary Examiner*—Michael L. Gellner
*Attorney, Agent, or Firm*—Carroll F. Palmer

[57] ABSTRACT

An underwater visual recording system capable of making consistently in-focus visual records of submarine objects includes a camera having a lens system with a predetermined depth-of-field, a first laser structured to emit a beam of coherent light of a first wavelength range, e.g. green light, a second laser structured to emit a beam of coherent light of a second wavelength range different from the first wavelength range, e.g. red light, and a support that holds the first laser spaced apart from the second laser with the camera therebetween so that the two laser beams project forward of the camera and cross one another within the camera's depth of field. In use of the system, it is positioned so the point of crossing of the laser beams is on the submarine object and then the camera is operated to make a visual recording.

16 Claims, 3 Drawing Sheets

UNDERWATER OPTICAL METHODS AND APPARATUS

BACKGROUND OF THE INVENTION

1. Field of the Invention

This invention relates broadly to apparatus and methods for making visual recordings of submarine objects. More particularly, it concerns improvements in such apparatus and methods that inform the system when an submarine object is in the camera's field of view and that its distance to the object is suitable for in-focus recording.

2. Description of the Prior Art

A great number of underwater visual recordings are made with photographic or video cameras which have limited remote controls. This is particularly true of deep-sea camera systems where camera lens opening and focus are preset and the photographer must somehow arrange for the subject to be at the correct distance and within the field of view at the time of exposure.

One approach to providing better control in submarine photography would be to incorporate the ranging features of advanced, above the surface cameras. Such cameras use a variety of techniques to obtain proper exposure conditions for control. The most common is a triangulation arrangement which superimposes the images received by a pair of space optical receives and provides automatic, mechanical adjustment of the lens until the received images are coincident. Microelectronics are used to perform the image comparison and thereby provide automatic focusing (see U.S. Pat. Nos. 3,435,744 and 4,313,654).

Other advanced surface cameras use microprocessor based optical-image analyzers to determine correct focus. Also, sonar systems are used in some cameras.

The optical systems of the surface cameras generally use infrared light beams with reflected light intensity, image analysis and triangulation. Unfortunately, the devices and techniques developed for surface cameras are not directly transferable to submarine camera systems. Differences between the physical properties of air and water result in major differences in the propagation of light and sound in the two media. Additionally, spurious material and signals can cause many "false" exposures to occur with submarine photography while this is not a serious consideration in use of surface cameras. Therefore, a camera system which depends on the propagation of energy waves for operation must be designed for the medium in which it is to be used.

Extensive development work has occurred relative to submarine photography, e.g., see "Underwater Photography—Scientific and Engineering Applications", compiled by Paul Ferris Smith, Van Nostrand Reinhold Company, 422 p., 1984. Such work has included use of (a) optical triggering of underwater cameras, e.g., see U.S. Pat. No. 3,446,555 and pp. 223-228, "Deep Sea Photography", J. B. Hersey, Editor, The Johns Hopkins Press, 1967, and (b) sonar techniques, e.g., see U.S. Pat. Nos. 4,105,990; 4,335,944; 4,381,144; 4,447,896 and copending U.S. patent application Ser. No. 842,139, filed Mar. 21, 1986.

Notwithstanding the extensive prior work and developments with surface and submarine camera systems, substantial improvements are needed for the submarine systems, e.g., to provide for (1) more efficient use of battery or other power, (2) saving of film, (3) mitigation of triggering of exposure by spurious materials or events and (4) the acquisition of consistently properly focused recordings.

OBJECTS

A principal object of the invention is the provision of improved apparatus and methods for submarine visual recording.

Further objects include the provision of:

1. Improvements in such apparatus and methods that inform the system when a submarine object is in the camera's field of view and that the distance to the subject is suitable for in-focus photography.

2. Relatively simple, radiant energy triangulation systems which accommodate existing photographic or video cameras.

3. Such camera systems that can verify that the camera to object distance is within the camera's depth of field.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of an underwater visual recording system capable of making consistently in-focus visual records of submarine objects which comprises a camera including lens means having a predetermined depth of field, a first laser structured to emit a beam of coherent light of a first wavelength range, e.g., red, a second laser structured to emit a beam of coherent light of a second wavelength range different from the first wavelength range, e.g. green, and means supporting the first laser spaced apart from the second laser with the camera therebetween so that the beams project forward of the camera and cross one another within the depth of field.

In preferred recording system of the invention, the first and second wavelength ranges are within the range visible to the human eye and a power source is connected by electrical conductor means and electrical control means to the lasers to energize them thereby to emit such light.

The control means comprises a pressure-sensitive switch to prevent the power source from energizing the lasers until the system is immersed to a predetermined depth in water and a trigger switch to control energizing of the lasers.

Additionally, the system includes a strobe light to illuminate space forward of the camera which at least includes the space where the laser beams cross.

The objects are further accomplished by the provision of a laser device for use in submarine service which comprises a laser unit including a portion through which the unit emits coherent light coaxially with the longitudinal axis of the unit, a waterproof pressure housing encloses the laser unit, a window is in one end of the housing through which light emitted by the laser unit can exit the housing and there is electrical conduit means for supplying power from an outside source to the laser unit plus a normally open pressure switch which permits flow of the power from the conduit to the laser unit only when the device is immersed to at least a predetermined depth in water.

The method of use of the new recording systems of the invention involves moving the supported lasers and camera toward a submarine object until the laser beams at their point of intersection coincide with the submarine object, and thereafter operating the camera to make a recording of the object. In preferred methods, where the laser positioned to the right of said camera emits green light and the second laser positioned to the left of said camera emits red light, the supported lasers and camera are moved toward the object when the red light beam appears to the right of said object and back from the object when the green light beam appears to the right of the object.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
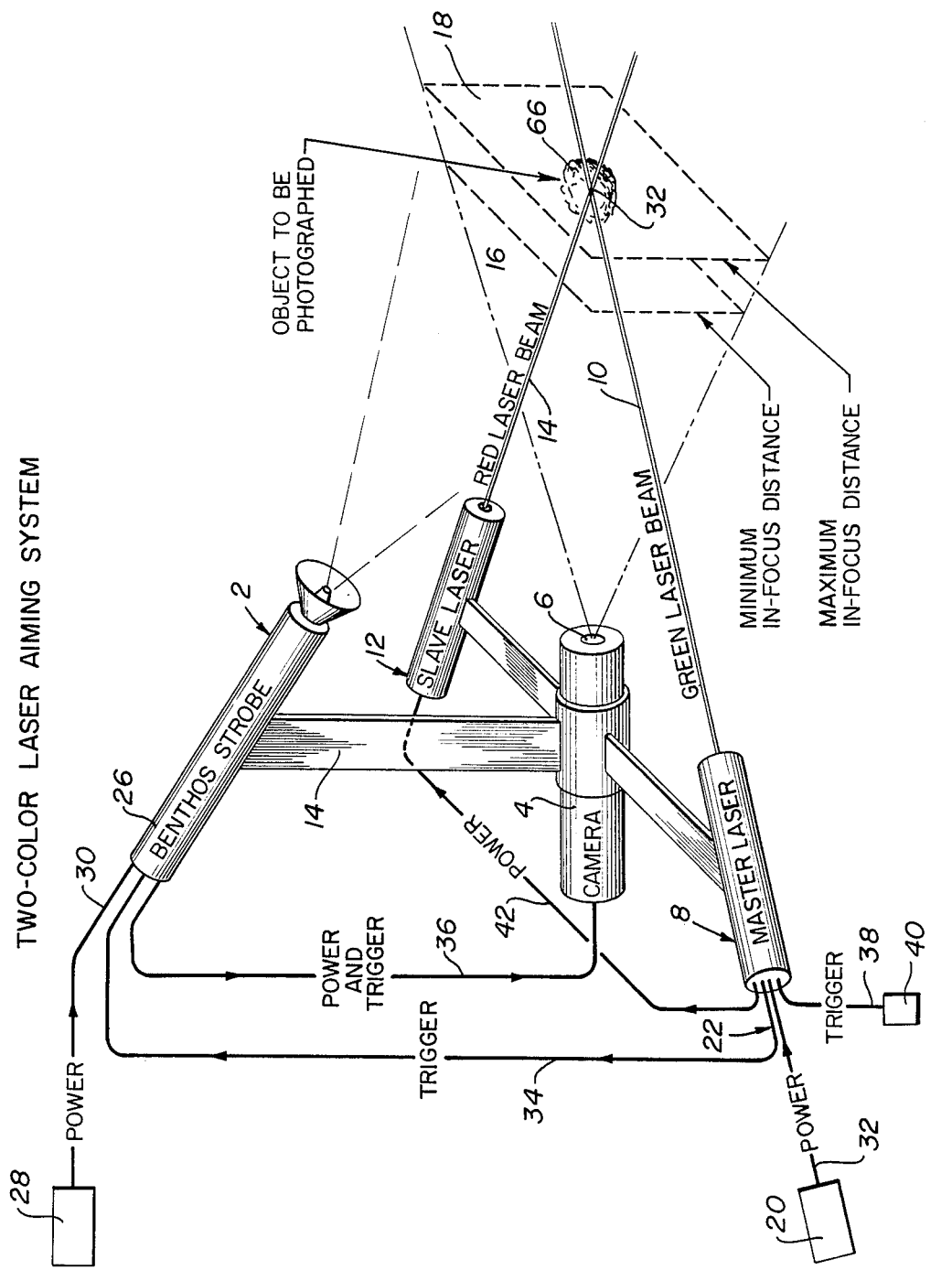
FIG. 1 is a perspective view of a two color laser containing submarine visual recording system of the invention.
Figure 2:
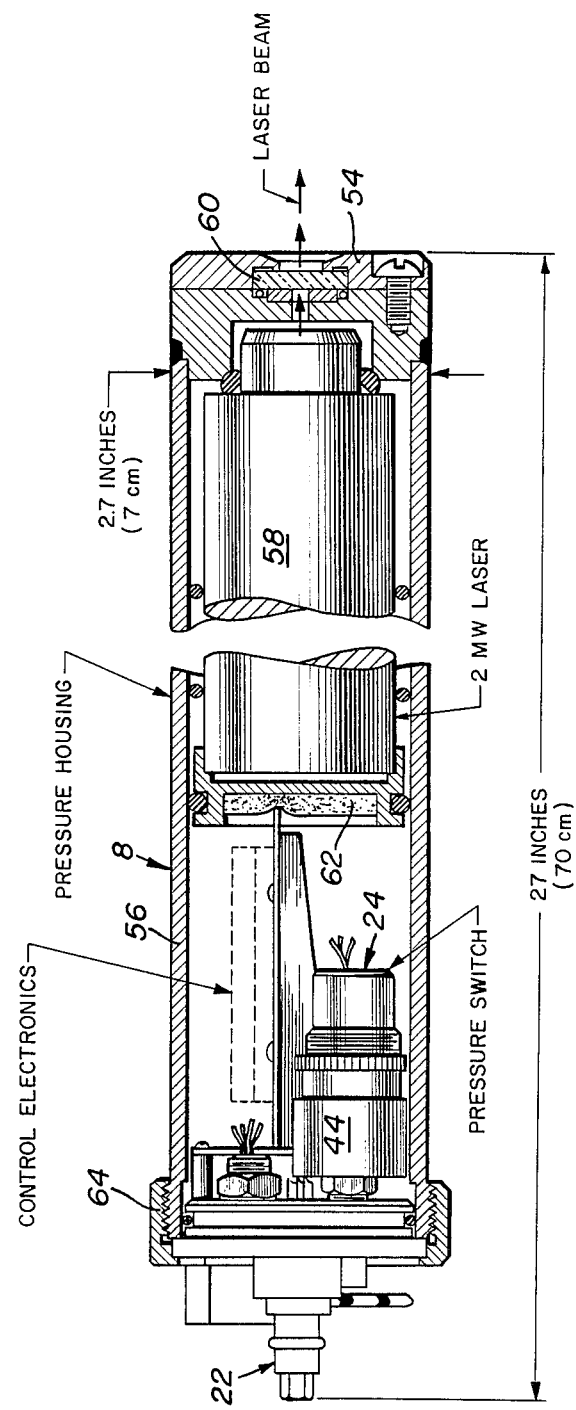
FIG. 2 is a sectional view of a laser unit used as a component of the system of FIG. 1.
Figure 3:
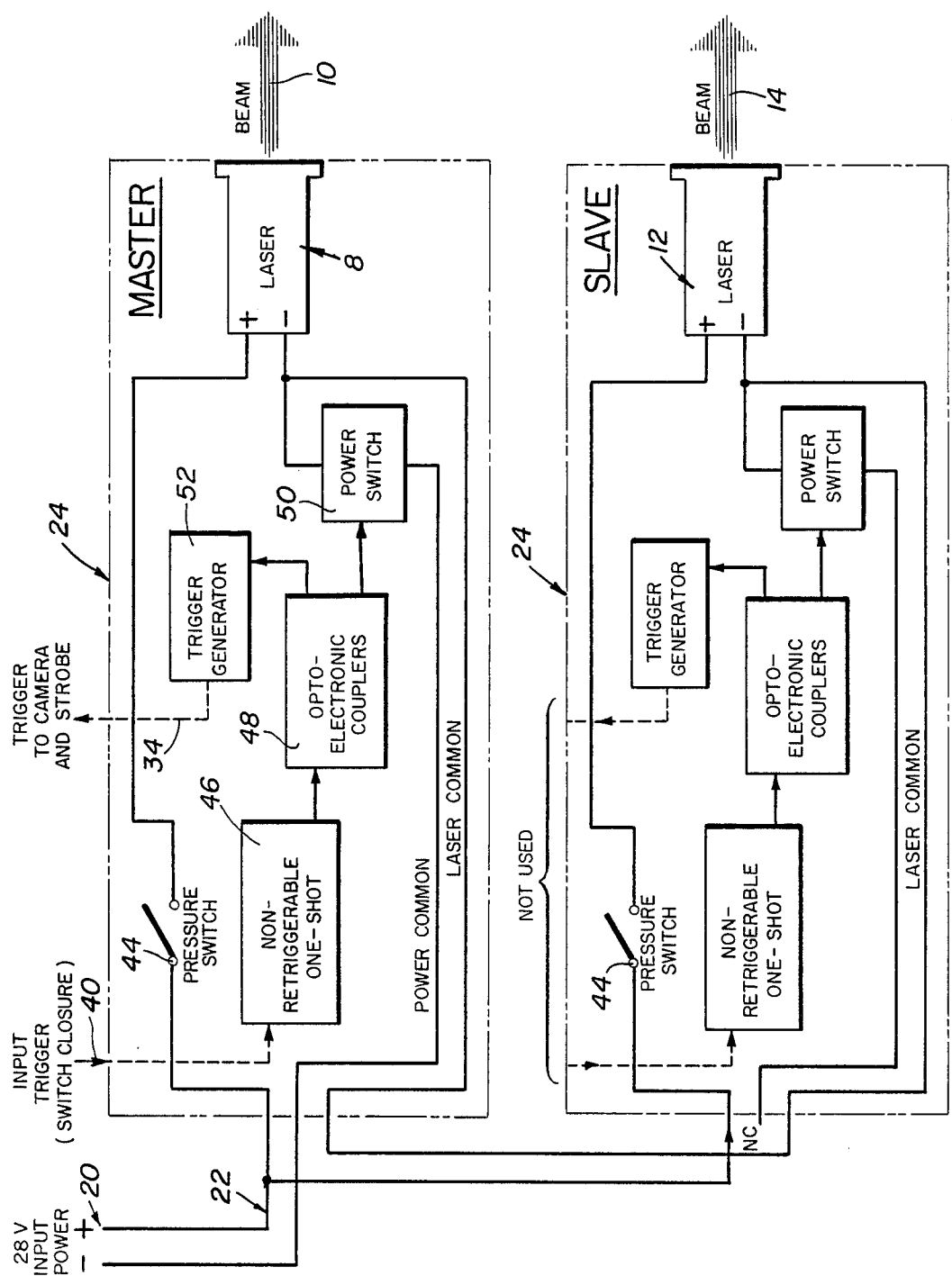
FIG. 3 is functional block diagram of the electrical components of the recording system of FIG. 1.

Referring in detail to the drawings, in which identical parts are identically marked, the invention comprises an underwater visual recording system 2 capable of making consistently in-focus visual records of benthic or other submarine objects which comprises a camera 4 including lens means 6 having a predetermined depth-of-field.

A first laser 8 structured to emit a beam 10 of coherent green light and a second laser 12 structured to emit a beam of coherent red light are mounted by support means 14 spaced apart with the camera 14 therebetween so that the beams 12 and 14 project forward of the camera and cross one another within the depth of field of the camera defined by its minimum in-focus distance 16 and maximum in-focus distance 18. A power source 20 is connected by electrical conductor means 22 and electrical control means 24 to the lasers 8 and 12 to energize them thereby to emit light.

The system 2 additionally includes a strobe light 26 powered by source 28 via conductor means 30 to illuminate space forward of the camera which at least includes the point 32 where beams 10 and 14 cross.

The conductor means 22 includes power line 32 from power source 20, trigger line 34 to strobe 26, power and trigger line 36 to the camera 4, trigger line 38 from trigger switch 40 to the master laser 8 and power line 42 from the master laser 8 to slave laser 12.

The electrical control means 24 in each laser unit 8 and 12 are essentially identical and includes a pressure-sensitive switch 44 that prevents the power source 20 from energizing the lasers 8 and 12 until the system 2 is immersed to a predetermined depth in water.

Control means 24 further includes the trigger switch 40 to control energizing of the lasers 8 and 12 via non-retriggerable one-shot integrate circuit 46, opto-electronic couplers 48 and turn then through a power switch 50 in series with the pressure-sensitive switch.

The couplers 48 also serve to connect the trigger generate 52 strobe 26 via line 34 and camera 4 via line 36 to the control of the system by the trigger switch 40.

The circuit 46 serves to ignore contact bounce or inadvertent retriggering signals for a period of time, e.g., one second. With normal operation of the lasers 8 and 12, the coupler 48 ensures that the trigger lines 34 and 36 are not connected into the power system.

The laser unit 8 includes a front portion 54 through which the unit emits coherent light coaxially with the longitudinal axis of the unit, a waterproof tubular pressure housing 56 enclosing the laser 58 and a window 60 in the front portion 54 of the housing through which light emitted by the laser 58 can exit the housing 56. The housing 56 also contains the electrical control means 24 in the form of printed circuit board and a foam cushion 62. The removable end cap 64 serves as a mounting base for the control means 24, the pressure switch 44 and the conductor means 22. Standard O-rings are used for sealing of the laser units.

The laser unit 12 is a substantial duplicate of laser unit 8, except that the emitted light will be a different and easily identifible color, e.g., green vs red. They typically will be 20" long by 2" diameter and will have a starting voltage of 10 KV, input power of 23–33 V d.c. at 0.6 A, an output power of 2mW minimum producing, in red beam embodiment, a laser beam of wavelength 632.8 nm. having a bandwidth less than 0.1 nm. with a beam diameter of 0.7 mm and a divergence of 1.2 m radian (full angle), e.g. the beam is 0.05" at window 60, 0.10" at 5 ft, 0.15" at 10 ft and 0.20" at 15 ft with an effective range up to 20 ft depending on water clarity and observation system sensitivity. In the green beam embodiment, the laser beam typically will have wavelength 543.5 nm. having a bandwidth less than 0.1 nm. with a beam diameter of 0.5 mm and a divergence of 1.6 m radian (full angle).

The beams 10 and 14 are visible in daylight or in the presence of floodlights.

The housing 56 is typically 25" long by 3' diameter, weight in air 5.5 lbs (in water 0.5 lbs) made of 6061-T6 aluminum with plastic hardware and is capable of operating at depths up to 3,000 ft. or even deeper with increase housing wall thickness. Pressure switch 44 will typically be structured to enable input power at a depth of 20 ft. or greater.

In the absence of the laser trigger 40, the lasers 8 and 12 are on during operation of the system 2, providing input power 20 is available and the safety interlock 44 is enabled. The power input to the second laser (slave) unit 12 is connected in parallel with power input to the laser unit 8 so that both are gated off and on simultaneously.

A typical trigger output 52 to the camera and strobe will be a solid-state, power-FET switch closure with automatic transfer to the laser trigger, in the event of power failure.

Typically in the new recording systems 2 the camera 4 will be a film recording camera or a video camera. The method of claim 14 wherein the first laser is positioned to the right of the camera and emits green light and the second laser is positioned to the left of the camera and emits red light.

In the methods of use of the new systems 2, lasers 8 and 12 and camera 4 are moved toward the object when the red light beam 14 appears to the right of the object 66 are moved back from the object 66 when the green light beam appears to the right of the object.

For still-photographic applications of the systems 2, it is advantageous to briefly turn off the lasers 8 and 12 so the photograph will not be contaminated. Thus, application of a trigger signal from switch 40 will turn the lasers off for 2 to 3 seconds, during which time a camera trigger signal is generated.

The embodiments of the invention in which an exclusive property of privilege is claimed are defined as follows:

1. An underwater visual recording system capable of making consistently in-focus visual records of submarine objects which comprises:
    a camera including lens means having a predetermined depth of field,
    a first laser structured to emit a beam of coherent light of a first wavelength range,
    a second laser structured to emit a beam of coherent light of a second wavelength range different from said first wavelength range, and
    means supporting said first laser spaced apart from said second laser with said camera therebetween so that said beams project forward of said camera and cross one another within said depth of field.

2. The underwater visual recording system of claim 1 where said first and second wavelength ranges are within the range visible to the human eye.

3. The underwater visual recording system of claim 2 wherein said first laser emits green light and said second laser emits red light.

4. An underwtaer visual recording system capable of making consistently in-focus visual records of submarine objects which comprises:
    a camera including lens means having a predetermined depth of field,
    a first laser structured to emit a beam of coherent light of a first wavelength range,
    a second laser structured to emit a beam of coherent light of a second wavelength range different from said first wavelength range,
    a power source connected by electrical conductor means and electrical control means to said lasers to energize them thereby to emit light, and
    means supporting said first laser spaced apart from said second laser with said camera therebetween so that said beams project forward of said camera and cross one another within said depth of field,
    said control means comprising a pressure-sensitive switch that prevents said power source from energizing said lasers until said system is immersed to a predetermined depth in water.

5. The underwater visual recording system of claim 4 wherein said first and second wavelength ranges are within the range visible to the human eye.

6. The underwater visual recording system of claim 5 wherein said first laser emits green light and said second laser emits red light.

7. The underwater visual recording system of claim 4 wherein said control means includes a trigger switch to control energizing of said lasers.

8. The underwater visual recording system of claim 7 wherein said control means additionally includes a power switch in series with said pressure-sensitive switch.

9. The underwater visual recording system of claim 8 wherein said power switch is actuated by a non-retriggerable one-shot switch connected in series with and between said trigger switch and said power source.

10. The underwater visual recording system of claim 4 which additionally includes a strobe light to illuminate space forward of said camera which at least includes the space where said laser beams cross.

11. The underwater visual recording system of claim 4 wherein said camera is a photographic camera.

12. The underwater visual recording system of claim 4 wherein said camera is a video camera.

13. A method of underwater visual recording which makes consistently in-focus visual records of submarine objects with a camera having lens means with a predetermined depth of field which comprises:
    providing a first laser structured to emit a beam of coherent light of a first wavelength range,
    providing a second laser structured to emit a beam of coherent light of a second wavelength range different rom said first wavelength range,
    supporting said first laser spaced apart from said second laser with said camera therebetween so that said beams project forward of said camera and cross one another within said depth of field,
    moving said supported lasers and camera toward a submarine object until said laser beams at their point of intersection coincide with said submarine object, and
    thereafter operating said camera to make a recording of said submarine object.

14. The method of claim 13 wherein said first laser is positioned to the right of said camera and emits green light and said second laser is positioned to the left of said camera and emits red light.

15. The method of claim 14 wherein said supported lasers and camera are moved toward said object when said red light beam appears to the right of said green beam.

16. The method of claim 14 wherein said supported lasers and camera are moved back from said object when said green light beam appears to the right of said red beam.

* * * * *